(12) United States Patent
Hagai et al.

(10) Patent No.: US 6,925,097 B2
(45) Date of Patent: Aug. 2, 2005

(54) DECODER, DECODING METHOD, MULTIPLEXER, AND MULTIPLEXING METHOD

(75) Inventors: Makoto Hagai, Osaka (JP); Takahiro Nishi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 841 days.

(21) Appl. No.: 09/820,311

(22) Filed: Mar. 29, 2001

(65) Prior Publication Data

US 2001/0038649 A1 Nov. 8, 2001

(30) Foreign Application Priority Data

Mar. 29, 2000 (JP) .................................... 2000-091985

(51) Int. Cl.[7] ................................................. H04J 3/04
(52) U.S. Cl. ...................... 370/535; 370/536; 370/537; 370/542; 348/423.1
(58) Field of Search ................................ 370/535, 536, 370/537, 542; 348/423.1

(56) References Cited

U.S. PATENT DOCUMENTS

| | | | | |
|---|---|---|---|---|
| 4,920,535 A | * | 4/1990 | Watanabe et al. | 370/512 |
| 4,977,558 A | * | 12/1990 | Iguchi et al. | 370/542 |
| 5,138,440 A | * | 8/1992 | Radice | 348/472 |
| 5,483,539 A | * | 1/1996 | Kaufmann | 370/509 |
| 5,537,148 A | * | 7/1996 | Fujinami | 348/473 |
| 5,913,031 A | * | 6/1999 | Blanchard | 709/204 |
| 5,974,055 A | * | 10/1999 | Imanishi | 370/503 |
| 6,072,832 A | * | 6/2000 | Katto | 375/240.28 |
| 6,141,385 A | * | 10/2000 | Yamaji | 375/240.27 |
| 6,584,120 B1 | * | 6/2003 | Shiomoto et al. | 370/473 |
| 6,631,403 B1 | * | 10/2003 | Deutsch et al. | 709/217 |

OTHER PUBLICATIONS

International Organization for Standardization Organization Internationale De Normalization ISO/IEC/JTC1/SC29/WG11 Coding of Moving Pictures and Audio, Alexandros Eleftheriadis et al., Nov. 15, 1998, pp. 13–14.

* cited by examiner

*Primary Examiner*—Steven Nguyen
*Assistant Examiner*—Clemence Han
(74) *Attorney, Agent, or Firm*—Wenderoth, Lind & Ponack, L.L.P.

(57) ABSTRACT

A decoder is provided which includes a demultiplexing unit for separating a multiplexed stream into plural streams by a demultiplexing process and a decoding unit for carrying out a decoding process for one of the plural separated streams, wherein the decoder selects one of the plural separated streams to output the same to the decoding unit such that a decoding process for one stream in the decoding unit is switched to a decoding process for another stream. The decoder is thus able to decode plural streams composing a multiplexed stream with one decoding unit.

16 Claims, 11 Drawing Sheets

DECODER, DECODING METHOD, MULTIPLEXER, AND MULTIPLEXING METHOD

FIELD OF THE INVENTION

The present invention relates to a decoder, a decoding method, a multiplexer and a multiplexing method and, more particularly, to an improved decoder, decoding method, multiplexer and multiplexing method, for receiving a multiplexed stream which is obtained by multiplexing plural streams and carrying out decoding processes for the respective streams included in the multiplexed stream in a parallel processing.

BACKGROUND OF THE INVENTION

In recent years, image compression technologies have become essential in cases where image data are transmitted on a narrowband channel or stored in a storage medium of small capacity. MPEG (Moving Picture Experts Group) as a media coding standard of the International Standardization Organization (ISO) is a typical one of these image compression technologies, and has come into wide use. In a system compliant with MPEG-4 which is the newest in MPEG standards and is being put to practical use, it is possible to carry out decoding processes for plural media streams in parallel and compose images corresponding to the respective streams to display the same.

FIG. 8 is a block diagram for explaining a prior art decoder. In this case, a media stream is one which is obtained by coding digital data corresponding to images, audio or the like composing one scene.

This prior art decoder 800 comprises a demultiplexing means 802 for carrying out a demultiplexing process for a multiplexed stream 801 which is obtained by multiplexing plural streams (in this prior art, two streams are taken as an example) on the side of an encoder, to separate the multiplexed stream into plural streams (in this case, two streams 803 and 806), a first decoding means 804 for decoding the stream 803 and outputting a decoded image data 805, a second decoding means 807 for decoding the stream 806 and outputting a decoded image data 808, and a composition means 809 for composing the decoded image data 805 and 808 and outputting a composed image data 810.

Next, the operation of the decoder 800 will be described.

In this decoder 800, the demultiplexing means 802 separates the input multiplexed stream 801 into the streams 803 and 806 by the demultiplexing process. Then, the first decoding means 804 decodes the stream 803 and outputs the decoded image data 805. Similarly, the second decoding means 807 decodes the stream 806 and outputs the decoded image data 808. When the decoded image data 805 and 808 are input to the composition means 809, the composition means 809 composes the decoded image data 805 and 808, and outputs the composed image data 810 to a display monitor (not shown). Thereby, on the display monitor, a composed image is displayed on the basis of the composed image data 810.

In the so-constructed decoder, the decoding processes for the respective streams are carried out in parallel by the decoding means corresponding to the respective streams, thereby composing images or the like corresponding to the respective streams to display the same.

Thus, the above-mentioned prior art decoder decodes the plural streams included in the multiplexed stream by the decoding means corresponding to the respective streams, and thus requires as many of the decoding means as the streams. Thus, the costs are high, especially for portable devices having such a decoder.

To be more specific, the above-mentioned decoding means can normally be realized by software or special hardware, while in portable devices decoding means realized by special hardware are often mounted to reduce power consumption. However, when a plurality of special hardware such as the decoding means are used in electronic devices such as the decoders, the costs of the devices are increased and, in some cases, the devices are upsized.

SUMMARY OF THE INVENTION

It is an object of the present invention to provide a decoder and a decoding method, which can decode plural streams included in a multiplexed stream by one decoding means, thereby suppressing an increase in costs or the upsizing of devices while reducing the power consumption, as well as a multiplexer and a multiplexing method, which multiplex a stream so as to enable decoding by a decoder with lower power consumption and of lower costs.

Other objects and advantages of the present invention will become apparent from the detailed description. Specific embodiments described are provided only for illustration since various additions and modifications within the spirit and scope of the invention will be apparent to those of skill in the art from the detailed description.

A decoder according to a 1st aspect of the present invention for receiving a multiplexed stream which is obtained by multiplexing plural streams, and carrying out a decoding process for each stream included in the multiplexed stream in a parallel processing comprises: a demultiplexing unit for separating the multiplexed stream into plural streams by a demultiplexing process; a decoding unit for carrying out a decoding process for one of the plural separated streams; and a stream selection unit for selecting one of the plural separated streams and outputting the selected one to the decoding unit, thereby converting a decoding target in the decoding unit from one stream to another stream. Therefore, the plural streams can be decoded by one decoding means, thereby suppressing an increase in the costs of the devices while reducing the power consumption, as well as downsizing the circuit scale of the decoder.

According to a 2nd aspect of the present invention, in the decoder of the 1st aspect, the stream selection unit has a position detection unit for detecting a stream switchable position in a stream being subjected to the decoding process, at which position the decoding unit can interrupt the decoding process, and the stream selection unit performs the stream selection such that the decoding process for the stream which is being processed is interrupted at the stream switchable position. Therefore, the decoding process for the stream can be switched among the plural streams without reducing the efficiency of the operation for the decoding process.

According to a 3rd aspect of the present invention, the decoder of the 1st aspect comprises: a stream storage unit for storing each of the plural separated streams by a predetermined amount from a head or stream switchable position thereof to a subsequent stream switch position, and the stream selection unit performs the stream selection such that the streams are output from the stream storage unit, successively from a stream for which the process for storing the stream by the predetermined amount has been completed. Therefore, the decoding process for the stream can be switched between the plural streams without reducing the efficiency of the operation for the decoding process.

According to a 4th aspect of the present invention, in the decoder of the 1st aspect, each of the plural separated streams is obtained by carrying out a coding process for digital data repeatedly for each predetermined coding unit, and the stream switchable position in each of the streams matches with a head position or rearmost position of the coding unit. Therefore, when the decoding process is switched among the respective streams, the delay in the image display corresponding to each of the streams hardly occurs.

A decoding method according to a 5th aspect of the present invention for carrying out a decoding process for a multiplexed stream which is obtained by multiplexing plural streams, in parallel for each of streams included in the multiplexed stream comprises: a demultiplexing process of separating the multiplexed stream into plural streams; a stream selection process of selecting one of the plural separated streams such that a target of a decoding process is converted from one stream to another stream; and a decoding process of decoding one of the plural separated streams output by the stream selection process, and the stream selection process detects a stream switchable position in a stream being subjected to the decoding process, at which position the decoding process can be interrupted, and performs the stream selection such that the decoding process for the stream which is being processed is interrupted at the stream switchable position. Therefore, the plural streams can be decoded by one decoding means, whereby the power consumption can be reduced while suppressing an increase in the costs of the devices, as well as the circuit scale of the decoder can be downsized.

A decoder according to a 6th aspect of the present invention for subdividing plural streams into first multiplexing units, receiving a multiplexed stream which is obtained by switching the respective streams successively for each of the first multiplexing units, and carrying out a decoding process for each stream included in the multiplexed stream comprises: a stream conversion unit for converting the multiplexed stream into a multiplexed stream composed of second multiplexing units which are obtained by gathering a plurality of the first multiplexing units together for the respective streams; a switch position detection unit for detecting a switch position of each of the multiplexing units in the multiplexed stream which has been converted by the stream conversion unit; and a decoding unit for carrying out a decoding process corresponding to each stream on the basis of the switch position information detected by the switch position detection unit. Therefore, the decoding process for each stream can be easily switched among plural streams separated from the multiplexed stream in the demultiplexing process, and the plural streams composing the multiplexed stream which has been multiplexed by the method of switching the stream in the multiplexing units can be decoded by one decoding means, whereby an increase in the costs of the devices is suppressed while reducing the consumed power, as well as the circuit scale of the decoder can be downsized.

According to a 7th aspect of the present invention, in the decoder of the 6th aspect, the second multiplexing unit is composed of from the head or stream switchable position of each of the plural streams to the subsequent stream switch position. Therefore, the decoding process for each stream can be easily switched among plural streams separated from the multiplexed stream by the demultiplexing process, and the plural streams composing the multiplexed stream which has been multiplexed by the method of switching the stream in the multiplexing units can be decoded by one decoding means, whereby an increase in the costs of the devices is suppressed while reducing the consumed power, as well as the circuit scale of the decoder can be downsized.

A decoder according to an 8th aspect of the present invention for subdividing plural streams into first multiplexing units, receiving a multiplexed stream which is obtained by switching each of the streams successively for each second multiplexing unit obtained by gathering a plurality of the first multiplexing units together for each of the streams, and carrying out a decoding process for each stream which is included in the multiplexed stream comprises: a stream conversion unit for adding switch position information indicating a switch position of each stream to the multiplexed stream, to perform conversion of the multiplexed stream; a switch position detection unit for detecting a switch position of each of the multiplexing units in the multiplexed stream which has been converted by the stream conversion unit; and a decoding unit for carrying out a decoding process corresponding to each stream, on the basis of switch position information detected by the switch position detection unit. Therefore, the decoding process for each stream can be easily switched among plural streams separated from the multiplexed stream by the demultiplexing process, and the multiplexed stream obtained by the method of switching the respective streams successively by each second multiplexing unit which is obtained by unifying a plurality of the first multiplexing units can be decoded by one decoding means, whereby an increase in the costs of the devices is suppressed while reducing the consumed power, as well as the circuit scale of the decoder can be downsized.

According to a 9th aspect of the present invention, in the decoder of the 8th aspect, the second multiplexing unit corresponds to from a head or stream switchable position of each of the plural streams to a subsequent stream switch position. Therefore, even when the multiplexed stream includes no specified switch position information, the switch positions of the plural streams are found and the plural streams can be decoded by one decoding means, whereby an increase in the costs of the devices is suppressed while reducing the consumed power, as well as the circuit scale of the decoder can be downsized.

A decoding method according to a 10th aspect for subdividing plural streams into first multiplexing units, receiving a multiplexed stream which is obtained by switching each of the streams successively for each of the first multiplexing units, and carrying out a decoding process for each stream included in the multiplexed stream comprises: a stream conversion process of converting the multiplexed stream into a multiplexed stream composed of second multiplexing units which are obtained by gathering a plurality of the first multiplexing units together; a switch position detection process of detecting a switch position of each of the multiplexing units in the multiplexed stream which has been converted by the stream conversion process; and a decoding process for decoding each stream, which is carried out correspondingly to the stream on the basis of switch position information detected by the switch position detection process. Therefore, the decoding process for each stream can be easily switched among plural streams separated from the multiplexed stream by the demultiplexing process, and the plural streams composing the multiplexed stream which has been multiplexed by the method of switching the stream in the multiplexing units can be decoded by one decoding means, whereby an increase in the costs of the devices is suppressed while reducing the consumed power, as well as the circuit scale of the decoder can be downsized.

A decoding method according to an 11th aspect of the present invention for subdividing plural streams into first multiplexing units, receiving a multiplexed stream which is obtained by switching each of the streams successively for each second multiplexing unit obtained by gathering a plurality of the first multiplexing units together for each of the streams, and carrying out a decoding process for each stream included in the multiplexed stream comprises; a stream conversion process of adding switch position information indicating a switch position of each stream to the multiplexed stream, to perform conversion of the multiplexed stream; a switch position detection process of detecting a switch position of each of the multiplexing units in a multiplexed stream which has been converted by the stream conversion process; and a decoding process for decoding each stream, which is carried out correspondingly to the stream, on the basis of the switch position information detected by the switch position detection process. Therefore, the decoding process for each stream can be easily switched among plural streams separated from the multiplexed stream by the demultiplexing process, and the multiplexed stream which is obtained by the method of switching the respective streams in the second multiplexing units which are obtained by unifying a plurality of the first multiplexing units, whereby an increase in the costs of the devices is suppressed while reducing the consumed power, as well as the circuit scale of the decoder can be downsized.

A multiplexer according to a 12th aspect of the present invention for multiplexing plural streams which are obtained by coding plural digital data, and outputting a multiplexed stream comprises: a position detection unit for detecting a switchable position in a stream to be multiplexed, at which position a decoding process for the stream can be interrupted; and a multiplexing unit for carrying out a multiplexing process of dividing each of the streams at the switchable position to generate divided stream parts corresponding to each stream and multiplexing the respective streams taking the divided stream part as a unit, to output the multiplexed stream Therefore, on the decoding end, the decoding process for each stream can be easily switched among the plural streams separated from the multiplexed stream by the demultiplexing process.

According to a 13th aspect of the present invention, in the multiplexer of the 12th aspect, the multiplexing unit carries out the multiplexing process such that information which identifies the switchable position corresponding to each stream is included in the multiplexed stream. Therefore, on the decoding end, the stream to be decoded can be switched on the basis of the information identifying the switchable position.

According to a 14th aspect of the present invention, in the multiplexer of the 12th aspect, each of the streams is obtained by carrying out a coding process for digital data repeatedly for each predetermined coding unit, and the stream switchable position of each of the streams matches with a head position or rearmost position of the coding unit. Therefore, the switching of the decoding process for the respective streams is performed at the head or end position of the coding unit, whereby when the decoding process is switched among the respective streams the delay in the image display corresponding to each stream can be made hardly occur.

A multiplexing method according to a 15th aspect of the present invention for multiplexing plural streams which are obtained by coding plural digital data, to generate a multiplexed stream comprises: a position detection process of detecting a switchable position in a stream to be multiplexed, at which position a decoding process for the stream can be interrupted; and a multiplexing process of dividing each of the streams at the switchable position to generate divided stream parts corresponding to each stream, and unifying the divided stream parts by the respective streams to generate the multiplexed stream. Therefore, on the decoding end, the decoding process for each stream can be easily switched among the plural streams separated from the multiplexed stream by the demultiplexing process.

According to a 16th aspect of the present invention, in the multiplexing method of the 15th aspect, the divided stream part includes a plurality of multiplexing units each having a predetermined stream length. Therefore, the switching of the decoding process for the respective streams is performed at the head or end position of the multiplexing unit, whereby when the decoding process is switched among the streams the delay in the image display corresponding to each stream can be made hardly occurs.

A multiplexing method according to a 17th aspect of the present invention for carrying out a multiplexing process for plural streams which are obtained by coding plural digital data, to generate a multiplexed stream comprises: a position detection process of detecting a switchable position in each stream, at which a decoding process for the stream can be interrupted; a division process of dividing each stream by a predetermined stream length, to generate divided stream parts as multiplexing units; and a header information addition process of adding, to a head of each of the divided stream parts, header information for identifying a corresponding stream, and a flag is added to header information corresponding to a divided stream part, an end position of which matches with a switchable position of the stream, for indicating that the end position matches with the switchable position of the stream. Therefore, on the decoding end, the decoding process for each stream can be easily switched among the plural streams separated from the multiplexed stream by the demultiplexing process, as well as the stream to be decoded can be switched on the basis of the information identifying the switchable position on the decoding end.

DETAILED DESCRIPTION OF THE PREFERRED EMBODIMENTS

Hereinafter, embodiments of the present invention will be described.

[Embodiment 1]

Figure 1:
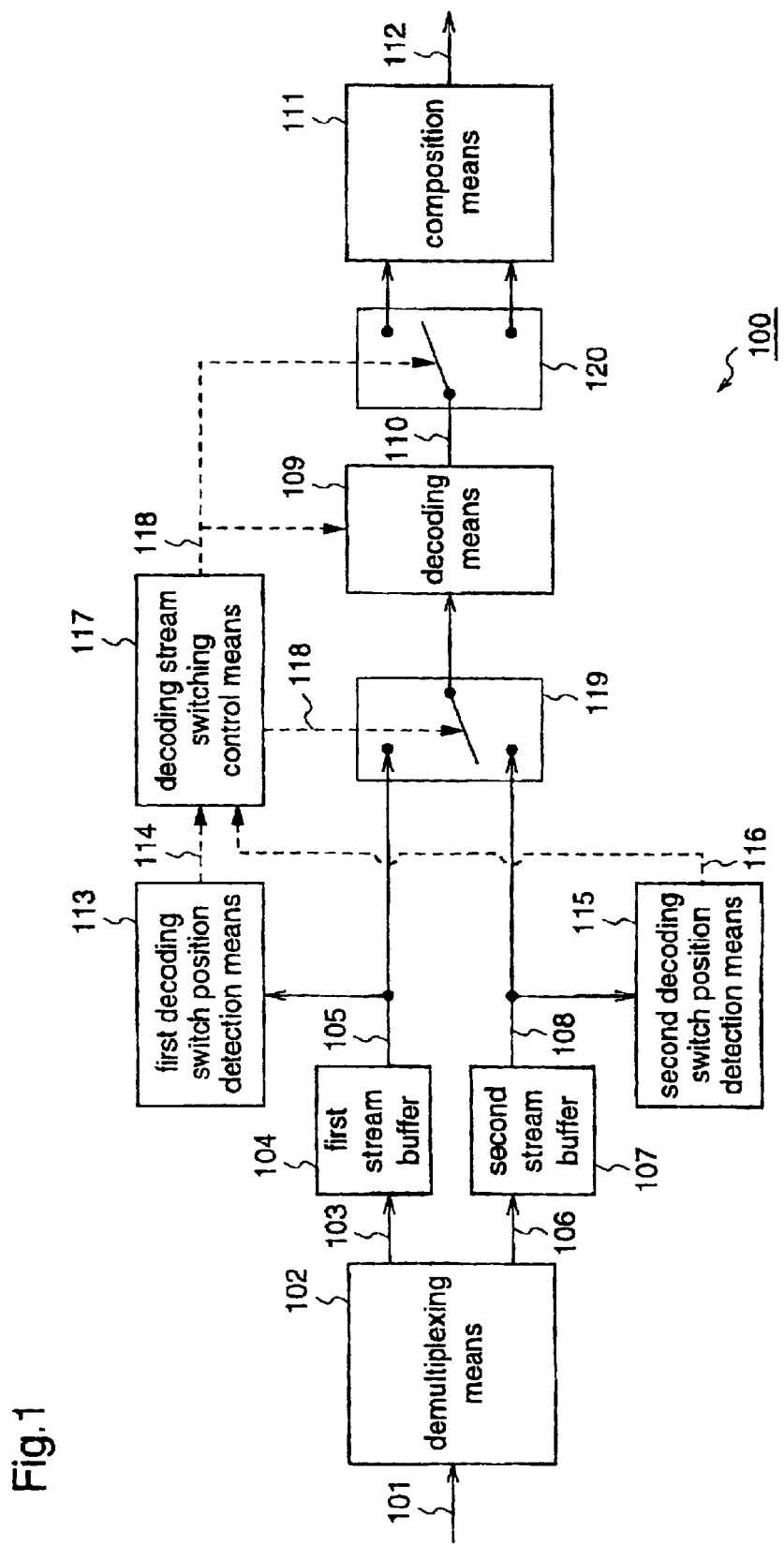
FIG. 1 is a block diagram for explaining a decoder according to a first embodiment of the present invention.

FIG. 1 is a block diagram for explaining a decoder according to the first embodiment of the present invention.

The decoder 100 of the first embodiment comprises a demultiplexing means 102 for receiving a multiplexed stream 101 and demultiplexing the multiplexed stream to separate this into a first stream 103 and a second stream 106, a first stream buffer 104 for containing the first stream 103, a second stream buffer 107 for containing the second stream 106, and a decoding means 109 for decoding streams 105 and 108 output from the first and second stream buffers 104 and 107, respectively.

This decoder 100 further comprises a first decoding switch position detection means 113 for detecting a position at which a decoding process for the stream 105 which is being decoded as a decoding target in the decoding means 109 can be switched to a decoding process for the other stream, and a second decoding switch position detection means 115 for detecting a position at which a decoding process for the stream 108 which is being decoded as a decoding target in the decoding means 109 can be switched to a decoding process for the other stream.

The decoder 100 further comprises a decoding stream switching control means 117 for judging whether the switching of the decoding process for the stream is to be executed or not, in accordance with signals 114 and 116 indicating the decoding switch positions in the streams 105 and 108, a stream selector switch 119 for selecting one of the streams 105 and 108 in accordance with a signal 118 indicating the judgement result of the decoding stream switching control means 117 and outputting the selected stream to the decoding means 109, a changeover switch 120 for outputting one of the decoded signals corresponding to the respective streams 105 and 108 from the decoding means 109 in accordance with the signal 118 indicating the judgement result, and a composition means 111 for composing the decoded signals corresponding to the respective streams 105 and 108 output from the changeover switch 120 and outputting a composed signal 112 to a display apparatus (not shown).

Next, the operation of the decoder 100 will be described.

In this first embodiment, one decoding means is used for plural streams by switching. However, in some cases, the positions in the stream at which the decoding can be switched from a stream which is being decoded by the decoding means to a stream other than that stream are restricted for the following reasons.

To be more specific, when the decoding switch positions are properly set, the amount of information to be retained for each stream is reduced, whereby the capacity of a working memory which is used during the decoding can be reduced. For example, in a case where a coded image stream is decoded, when the switching during decoding of a frame is to be realized, a memory for containing working information during the frame decoding is required for each stream. However, when the stream to be decoded is switched on a frame boundary, the memory for containing the working information during the frame decoding can be commonly used for all the streams. Further, when the decoding switch positions are properly set, the packaging in the decoding means can be simplified. Particularly, when the decoding is carried out by hardware, since the packaging of the apparatus for switching the decoding at an arbitrary position makes the apparatus difficult, thereby reducing the processing speed, it is effective to limit the decoding switch positions at proper positions such as the frame boundary.

As a decoding switch position other than the frame boundary, a boundary between coding units which are smaller than a frame (a slice in the case of video of MPEG1 or 2 as the media coding standard of the International Standardization Organization, a video packet in the case of MPEG4 video or the like) can be used.

The description will be given assuming that the decoding means for switching the stream to be decoded at the decoding switch positions which are limited for the above-mentioned reason is used and the decoding switch position detection means detects the above-mentioned decoding switch positions in the present invention.

The demultiplexing means 102 carries out the demultiplexing process for the input multiplexed stream 101 and outputs the streams 103 and 106 included in the multiplexed stream. These streams 103 and 106 are stored in the first stream buffer 104 and the second stream buffer 107 by prescribed amounts, respectively by stream. Then, the stream 105 is output from the first stream buffer 104, and the stream 108 is output from the second stream buffer 107.

Then, the first and second decoding switch position detection means 113 and 115 detect switch positions in the streams 105 and 108, at which the decoding process can be interrupted, and outputs the signals 114 and 116 indicating the decoding switch positions to the decoding stream switching control means 117.

The decoding stream switching control means 117 outputs the control signal 118 to the decoding means 109, the stream selector switch 119 and the stream change switch 120, in accordance with the signals 114 and 119.

The stream selector switch 119 selects one of the streams 105 and 108 in accordance with the control signal 118, and outputs the selected stream to the decoding means 109. The decoding means 109 carries out the decoding process for the stream as well as switches the decoding target stream in accordance with the control signal 118. Further, the stream change switch 120 outputs the decoded signal 110 output from the decoding means 109 to one of input terminals of the composition means 111 corresponding to the respective streams, by switching, in accordance with the control signal 118.

The composition means 111 composes the decoded signals which have been input to the input terminals corresponding to the respective streams, and outputs the composed image signal 112 to the display apparatus (not shown).

Next, the operation for switching the decoding target stream in the decoder will be described with reference to FIG. 2. Here, the description is given of a case where the decoding processes for two streams are carried out.

In this figure, numerals 202 and 204 denote switchable positions in the first stream 105, and numerals 206 and 208 denote switchable positions in the second stream 108. Numerals 201 and 203 denote stream parts which are partitioned by the switchable positions 202 and 204 in the first stream 105, and numerals 205 and 207 denote stream parts which are partitioned by the switchable positions 206 and 208 in the second stream 108. This stream part is composed of, for example, one frame of a stream.

Figure 2:
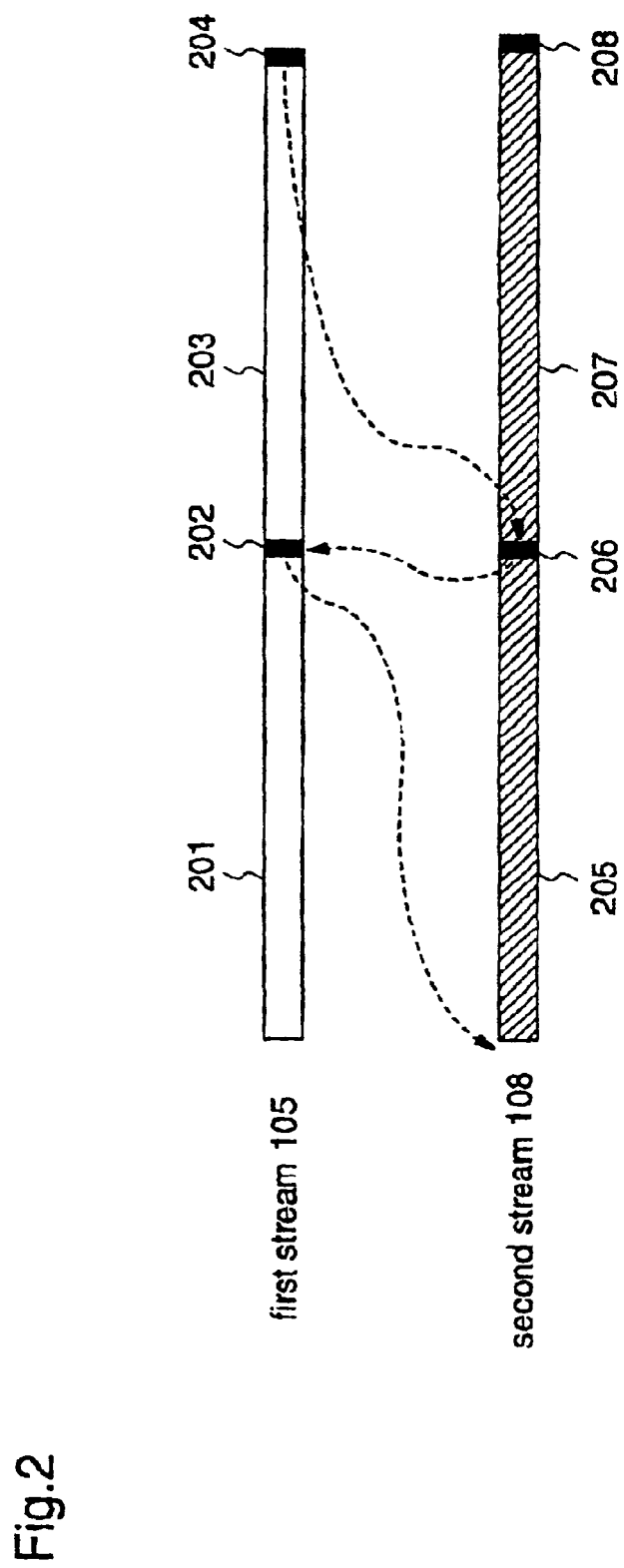
FIG. 2 is a diagram for explaining a switching operation in a decoding process of the decoder according to the first embodiment.

The respective streams 105 and 108 are input to the demultiplexing means 102 successively from the left ends shown in FIG. 2, and the first stream 105 is stored in the first stream buffer 104 and the second stream 107 is stored in the second stream buffer 107, respectively. Initially, assume that the first stream 105 is input first to the decoding means 109. One frame 201 of the first stream 105 is input, and then at a time when the first decoding switch position detection means 113 detects the switchable position 202, the decoding stream switching control means 117 controls the stream selector switch 119, thereby switching the stream which is input to the decoding means 109 from the first stream 105 to the second stream 108. One frame 205 of the second stream 108 is input, and then at a time when the second decoding switch position detection means 115 detects the switchable position 206, the decoding stream switching control means 117 controls the stream change switch 120, whereby the decoded signal 110 output from the decoding means 109 is output to the input terminal of the composition means 111, corresponding to the second stream, by the switching.

Then, the decoding means 109 decodes the second stream 108. At the time when the second decoding switch position detection means 115 detects the switchable position 206, the decoding stream switching control means 117 controls the stream selector switch 119, thereby switching the stream to be input to the decoding means 109 from the second stream 108 to the first stream 105. Further, the decoding stream switching control means 117 controls the stream change switch 120, whereby the decoding result of the first stream 105 which has been input first to the decoding means 109 is output to the composition means 111.

Thereafter, each time when the decoding switch position is detected in the stream which is being decoded, the stream selector switch 119 and the stream change switch 120 are switched similarly so that the stream which is input to the decoding means 109 and the demodulated signal which is input to the composition means 111 are different streams from each other. To be more specific, the stream selector switch 119 and the stream change switch 120 are switched, respectively, so that when the stream which is input to the decoding means 109 is the first stream, the demodulated signal which is input to the composition means 111 is the one obtained by decoding the second stream, and when the stream which is input to the decoding means 109 is the second stream, the demodulated signal which is input to the composition means 111 is the one obtained by decoding the first stream.

As described above, the decoder according to the first embodiment carries out the process of decoding plural streams composing a multiplexed stream, with switching the decoding target stream in the middle of the decoding process. Therefore, the plural streams composing the multiplexed stream can be decoded by one decoding means, whereby the costs of the device can be reduced. Further, the circuit scale of the decoder can be downsized.

In this case, a time stamp for indicating a display time is added to a part corresponding to each frame of the plural streams. Thus, the streams can be switched so that a stream having the earliest time indicated by the time stamp at a time when the decoding switch position is detected, is input to the decoding means 109 with priority.

In cases where the time stamp is not added to each frame, it is possible that the two decoding switch position detection means judge that one frame of the stream has been stored in the stream buffer 104 and 107, and then input the streams to the decoding means successively from the one which has been stored by one frame.

Further, the decoding switch signal (control signal) 118 includes information for identifying each stream. The decoding means 109 can use this identification information to switch working information required for the decoding of each stream (for example, reference images used in the prediction coding).

Further, the decoding switch position (switchable position) can also be detected from information included in the stream.

In some of the existing multiplexing methods, the multiplexing process is also carried out for information which indicates a start or end position of a frame in video data. For example, MPEG1 or 2 compliant video formats in a RTP (real-time transport protocol) as an Internet standard protocol, have a flag indicating the end of a video frame. Therefore, the end of the frame can be detected by detecting this flag.

Further, in the formats of MPEG1, 2 system or RTP, the display time information (time stamp) varying with frames is added as the header of a bitstream of the frame. Thus, the beginning of the frame can be detected from a change point of the time stamp.

In cases where the decoding means which can switch the decoding target stream on the frame boundary is used, the decoding switch position in each stream can be detected using information of the frame boundary included in the above-mentioned formats.

In some types of the image coding method, a specific code indicating the beginning of a frame, a slice or a video packet is inserted in a stream. For example, in MPEG, a specific code called start code is always inserted at the top of a frame or the like. In this case, the decoding switch position in each stream can also be detected by detecting this start code.

Next, problems in a case where a first stream 105a and a second stream 108a having different frame rates, respectively, are included in the multiplexed stream are described with reference to FIG. 3.

In this figure, numerals 302 and 304 denote end positions of frames, i.e., decoding switch positions in the first stream 105a. Numeral 301 and 303 denote stream parts corresponding to the respective frames in the first stream 105a (hereinafter, referred to as frame parts). Numeral 306, 308 and 310 denote end positions of frames, i.e., decoding switch positions in the second stream 108a. Numeral 305, 307 and 309 denote frame parts corresponding to the respective frames in the second stream 108a.

Here, assume that the frame rate of the first stream 105a is lower than the frame rate of the second stream 108a. Further, assume that the decoder updates the display of a composed image at a time when each stream has been decoded up to its decoding switch position.

In this case, the decoder decodes first the frame part 301 of the first stream 105a, and switches the frame part to be decoded to the frame part 305 of the second stream 108a at a time when the decoding switch position 302 is detected.

Then, the decoder decodes the frame part 305, and switches the frame part to be decoded to the frame part 303 of the first stream 105a at a time when the decoding switch position 306 is detected.

Here, the decoding/display time of the frame part 307 of the second stream is earlier than the decoding/display time of the frame part 303 of the first stream, but the decoder is now decoding the frame part 303 and thus the decoding target stream cannot be switched to the second stream. Consequently, the display of the frame part 307 is substantially delayed.

However, when each stream is decoded after being stored up to the decoding switch position, this problem is solved. To be more specific, in the decoder, the respective streams are stored in the stream buffer at least up to the decoding switch positions, and then the decoding processes are started in the order in which the respective streams have been stored up to the decoding switch positions.

Next, a decoder having a structure for storing the stream up to the decoding switch position will be briefly described with reference to FIG. 3.

Figure 3:
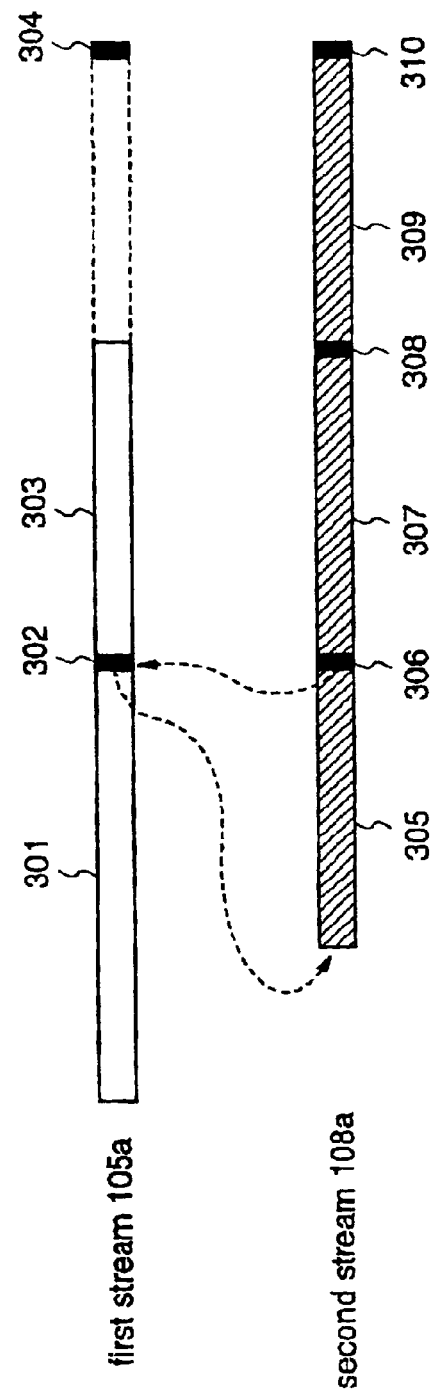
FIG. 3 is a diagram for explaining the switching operation in the decoding process in a case where the frame rates vary with plural streams which are to be targets of the decoding process according to the first embodiment.

FIG. 3 shows a variation of the first embodiment of the present invention. In this figure, after decoding the frame part 305 of the second stream 108a, the decoder stands by the decoding process until the frame part 303 of the first stream 105a and the frame part 307 of the second stream 108a up to the decoding switch position 308 are stored in the stream buffer. In this case, the frame part 307 of the second stream 108a is stored up to the decoding switch position before the frame part 303 of the first stream 105a has been stored. Therefore, the decoder can decode the frame part 307 of the second stream 108a next to the frame part 305 of the second stream 108a.

Then, after decoding the frame part 307, the decoder decodes one of the frame part 303 of the first stream 105a and the frame part 309 of the second stream 108a, the one which has been stored up to the decoding switch position in the stream buffer earlier.

As described above, the decoding is started after the stream has been stored up to the decoding switch position, whereby the image display for each stream can be performed with the minimum required delay.

In the MPEG system or the like, the multiplexing is carried out so that one frame of data has been stored in the buffer by the display time indicated by the time stamp. Accordingly, it may be expected that the above-mentioned problems do not arise when the decoding process is carried out in accordance with the time stamp. However, in cases where data transmission is performed using a transmission line having a larger jitter of transmission delay, there are some cases where one frame of data has not arrived even at the display time indicated by the time stamp. Therefore, also when the time stamp is included in the stream, the method for carrying out the decoding process for the stream after confirming that the stream has been stored up to the decoding switch position is effective.

In this first embodiment, the decoding switch position detection means detects the decoding switch position. However, it is also possible that the decoding switch position detection means is not used and the decoding means detects the decoding switch position with decoding the stream. As a method for realizing this, there is a method for switching a decoding target stream only at a time when the decoding process for a part in each stream, corresponding to a frame, a slice, a video packet, a macroblock, a block or the like of MPEG video has been finished.

Further, in this first embodiment, the method for decoding the stream after storing the same up to the decoding switch position is shown. However, when the information of the decoding switch position in the stream is lost due to errors on the transmission line or the like, the stream cannot be decoded by this method. Accordingly, a method for shifting the decoding process forcefully to the next frame part when a predetermined time elapsed from a time when a frame part of the stream is received last or a time indicated by the time stamp corresponding to a frame part of the received stream can be used to take measures against this problem. At this time, it is also possible to throw away data of a frame part including an error or decode only a data part which can be received.

Further, in this first embodiment, two streams are included in the multiplexed stream. However, decoding processes for three or more streams included in a multiplexed stream can be carried out in parallel in a similar way to that in the first embodiment.

Further, the first embodiment is described taking the streams obtained by coding the video data as an example. However, even when the streams included in the multiplexed stream are plural streams which are obtained by coding other media data such as audio, the similar parallel decoding process to that in the first embodiment can be carried out for these streams.

Furthermore, in this first embodiment, plural stream buffers are used so that one stream buffer corresponds to each stream. However, plural streams can be stored in one stream buffer. In this case, it is necessary for the demultiplexing means to add identification information to a stream stored in the stream buffer, for identifying this stream among the streams included in the multiplexed stream, and store each of the streams in the stream buffer.

[Embodiment 2]

Figure 4:
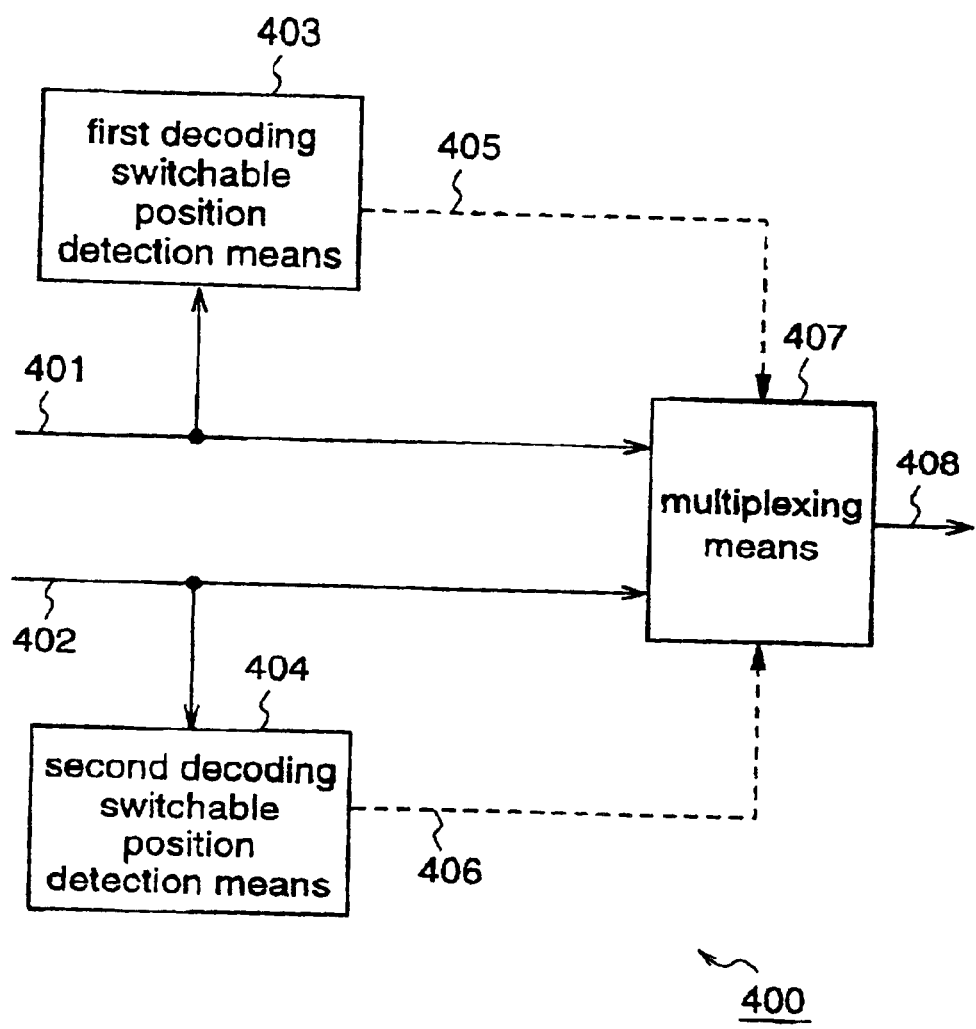
FIG. 4 is a block diagram for explaining a multiplexer according to a second embodiment of the present invention.

FIG. 4 is a block diagram for explaining a multiplexer according to the second embodiment of the present invention.

The multiplexer 400 according to the second embodiment comprises a first decoding switchable position detection means 403 for detecting a position in a first stream 401 to be multiplexed, at which the decoding process can be interrupted (decoding switch position) and outputting a signal 405 indicating a decoding switchable position, a second decoding switchable position detection means 404 for detecting a position in a second stream 402 to be multiplexed, at which the decoding process can be interrupted (decoding switch position) and outputting a signal 406 indicating a decoding switchable position, and a multiplexing means 407 for multiplexing the streams 401 and 402 together with the signals 405 and 406 indicating the decoding switchable positions, and outputting a multiplexed stream 408.

Next, the operation of the multiplexer will be described.

In the multiplexer 400 of the second embodiment, the first decoding switchable position detection means 403 detects the decoding switch position in the stream 401 to be multiplexed, at which the decoding process can be interrupted, on the basis of the stream 401, and outputs the signal 405 indicating the decoding switchable position to the multiplexing means 407. Here, the decoding switchable position can be detected by deciding a position at which the decoding process can be interrupted, as the end position of, for example, a frame, a slice or a video packet. Similarly, the second decoding switchable position detection means 404 detects a position in the stream 402 to be multiplexed, at which the decoding process can be interrupted, on the basis of the stream 402, and outputs the signal 406 indicating the decoding switchable position to the multiplexing means 407.

Then, the multiplexing means 407 multiplexes the information 405 and 406 of the decoding switchable positions together with the respective streams 401 and 402, and outputs the multiplexed stream 408.

Figure 5:
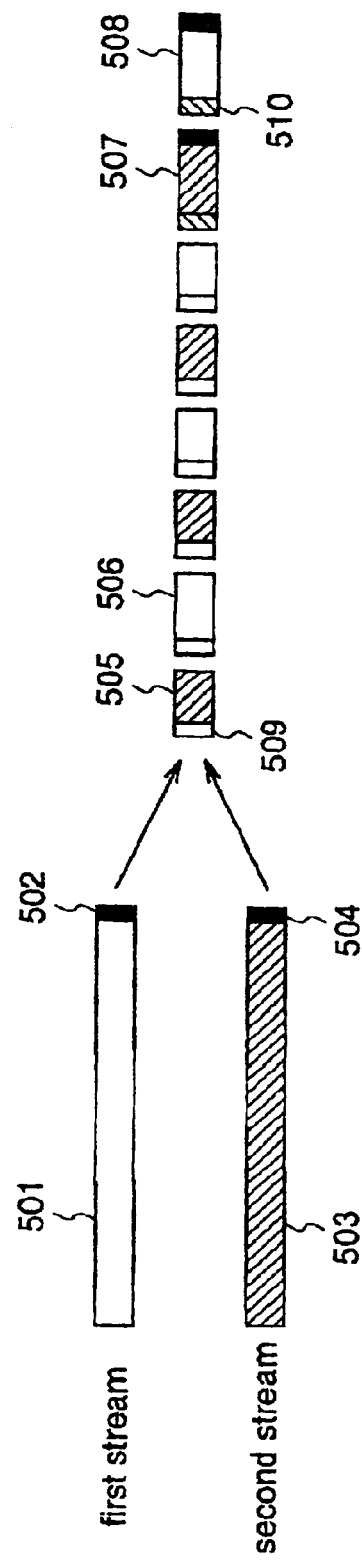
FIG. 5 is a diagram for explaining a method for multiplexing information indicating a decoding switch position by the multiplexer of the second embodiment.

FIG. 5 is a diagram for specifically explaining the method for multiplexing the information of the decoding switchable positions according to the second embodiment.

In this figure, numerals 501 and 503 denote first and second streams, respectively. Numerals 502 and 504 denote decoding switchable positions in the first and second streams 501 and 503, respectively. Numerals 506 and 508 denote multiplexing units in the first stream 501, and numerals 505 and 507 denote multiplexing units in the second stream 503.

The multiplexing means 407 subdivides the first and second streams 501 and 503 successively from the left ends in FIG. 5 into the multiplexing units, respectively, and alternately switches the multiplexing units of the first and second streams for each multiplexing unit, thereby carrying out the multiplexing process.

In this multiplexing process, the multiplexing target streams 501 and 503 are divided into the multiplexing units 506–508 and 505–507, respectively, and then multiplexed. Normally, header information 509 or 510 including an identifier for identifying each stream (channel number or the like) is added at the top of each multiplexing unit. In this multiplexing process, information of a decoding switch position can be inserted into the multiplexed stream, for example, by adding a flag for indicating that the end position of the multiplexing unit is a decoding switch position, to the header information.

Figure 9:
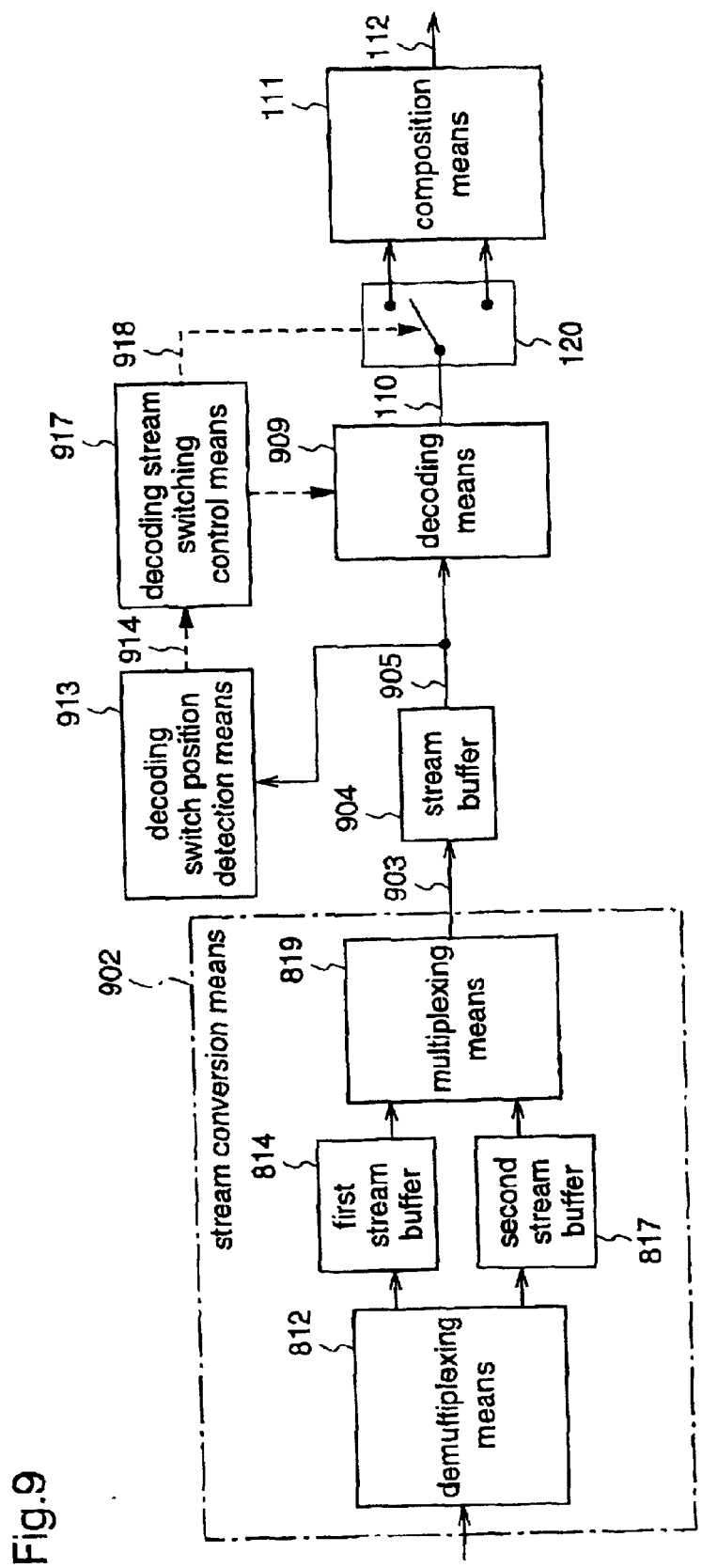
FIG. 9 is a block diagram for explaining a decoder for decoding a stream multiplexed by the multiplexing method shown in FIG. 5.
Figure 10:
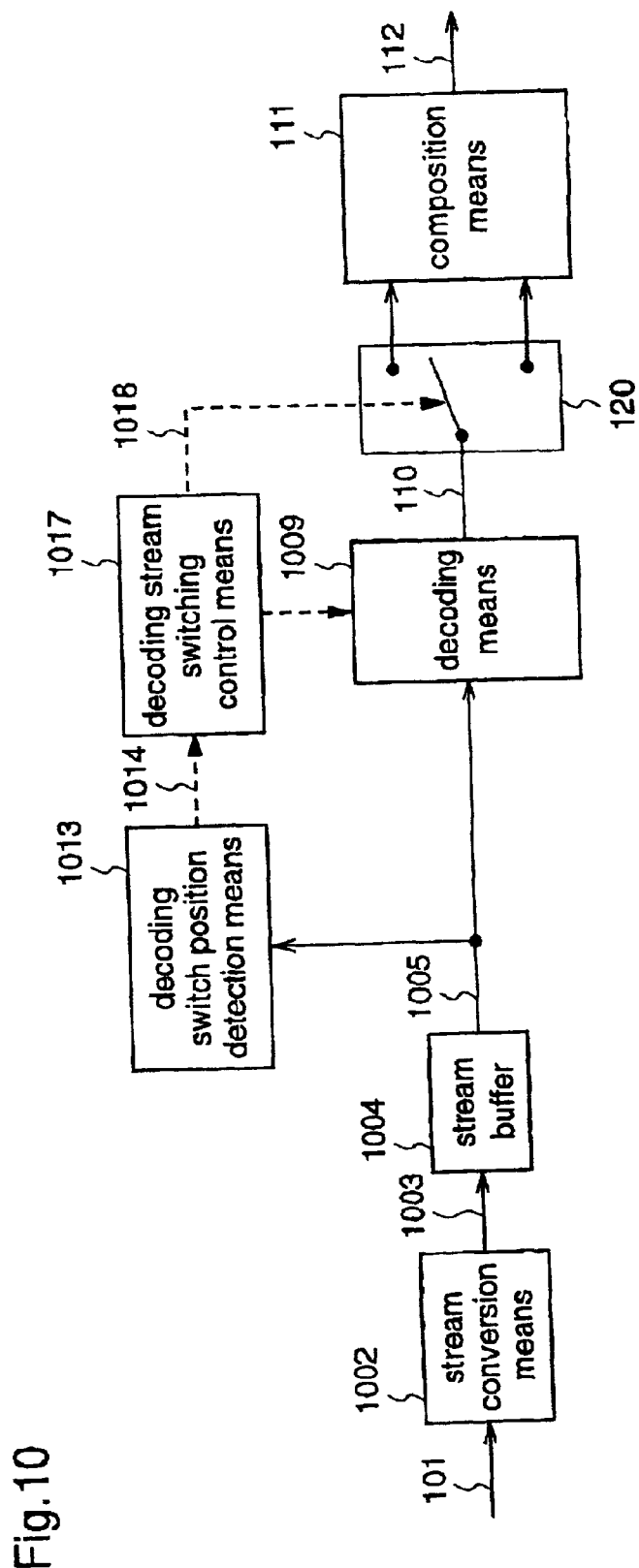
FIG. 10 is a block diagram for explaining a decoder for decoding a stream multiplexed by the multiplexing method shown in FIG. 6.

A decoder for decoding a stream multiplexed by this multiplexer is constructed as shown in FIG. 9.

This decoder includes a stream conversion means 902 comprising a demultiplexing means 812 for demultiplexing a stream to be demultiplexed, first and second stream buffers 814 and 817 for containing demultiplexed first and second streams, respectively, and a multiplexing means 819 for multiplexing the first and second streams output from the stream buffers 814 and 817, respectively, a stream buffer 904 for containing an output 903 of the stream conversion means 902, a decoding means 909 for decoding an output 905 of the stream buffer 904, a decoding switch position detection means 913 for detecting a position in the decoding target stream 905 being decoded by the decoding means 909, at which a decoding process for this stream being decoded can be switched to a decoding process for a stream other than this stream, a decoding stream switching control means 917 for judging whether the switching of the decoding process for the stream is executed or not in accordance with a signal 914 indicating the decoding switch position in the stream 905, a change switch 120 for outputting one of decoded signals corresponding to the respective streams from the decoding means 909 in accordance with a signal 918 indicating the judgement result, and a composition means 111 for composing the decoded signals corresponding to the respective streams output from the change switch 120 and outputting a composed signal 112 to a display device (not shown).

Next, the operation of the decoder will be described. This decoder receives a multiplexed stream shown on the right in FIG. 5, and separates the multiplexed stream into the multiplexing units 506, . . . , 508 resulting from the first stream 501 and the multiplexing units 505, . . . , 507 resulting from the second stream 502, by the demultiplexing means 812 of the stream conversion means 902, respectively. This separation can be easily executed because the respective multiplexing units have a predetermined length. The separated multiplexing units 506, . . . , 508 are stored in the first stream buffer 804 and the separated multiplexing units 505, . . . , 507 are stored in the second stream buffer 807, respectively, successively by one multiplexing unit. Assuming that the multiplexed stream comprises for example two frames, the first and second stream buffers 814 and 817 normally require the capacity of two frames, respectively. However, since the demultiplexed data are stored in the buffers, these stream buffers 814 and 817 require only a small capacity of one frame, respectively. Then, the data which are stored by one multiplexing unit are multiplexed by the multiplexing means 819 by alternately switching the data from the first stream buffer 814 and the data from the second stream buffer 817 frame by frame, and the multiplexed stream 903 is output to the stream buffer 904. This multiplexing can be easily executed, because the number of the multiplexing units of one frame is already known.

To be more specific, the stream conversion means 902 converts the stream multiplexed in small units such as video packets, into the stream 903 multiplexed in larger units such as frames.

Then, this stream 903 is stored in the stream buffer 904, and the decoding stream control means 917 controls the decoding means 909 and the stream change switch 120 at a time when the decoding switch position detection means 913 detects the flags corresponding to the switchable positions 502 and 504 from the output stream 905, whereby the decoding result of the first stream 501 which has been input first to the decoding means 909 is output to the corresponding input terminal of the composition means 111.

Thereafter, similarly, each time when the decoding switch position is detected from the stream being decoded, the stream change switch 120 is switched so that the stream input to the decoding means 609 and the demodulated signal output to the composition means 111 become the same stream, i.e., when the stream input to the decoding means 909 is the first stream, the demodulated signal output to the input terminal of the composition means 111 corresponding to the stream is the one obtained by decoding the first stream, and when the stream input to the decoding means 909 is the second stream, the demodulated signal output to the input terminal of the composition means 111 corresponding to the stream is the one obtained by decoding the second stream.

The composition means 111 composes the decoded signals which are input to the input terminals corresponding to the respective streams, and outputs the composed image signal 112 to the display device (not shown).

In this decoder, it is sufficient for the first and second stream buffers constituting the stream conversion means 902 to have a smaller capacity, whereby the stream multiplexed by this multiplexer can be decoded by one decoding means.

As described above, the multiplexer according to the second embodiment detects the decoding switchable positions in each of the plural streams to be multiplexed, then multiplexes the plural streams together with the signals indicating the decoding switchable positions, and outputs the multiplexed stream. Therefore, in the decoder to which the multiplexed stream obtained by the multiplexing process of this multiplexer is supplied, the decoding switch position can be detected by the demultiplexing of the multiplexed stream, whereby the process for switching the decoding process for the stream among plural streams can be easily carried out.

[Variations of the Second Embodiment]

Next, a multiplexing method for carrying out the multiplexing without carrying out the process for inserting the above-mentioned specified information indicating the decoding switch position into the multiplexed stream as in the second embodiment will be described.

Initially, a first multiplexing method in which the specified information indicating the decoding switch position is not multiplexed is described.

In this method, the stream to be multiplexed is switched only at switch positions at which the decoder can interrupt the decoding process for the stream, to multiplex the stream.

Figure 6:
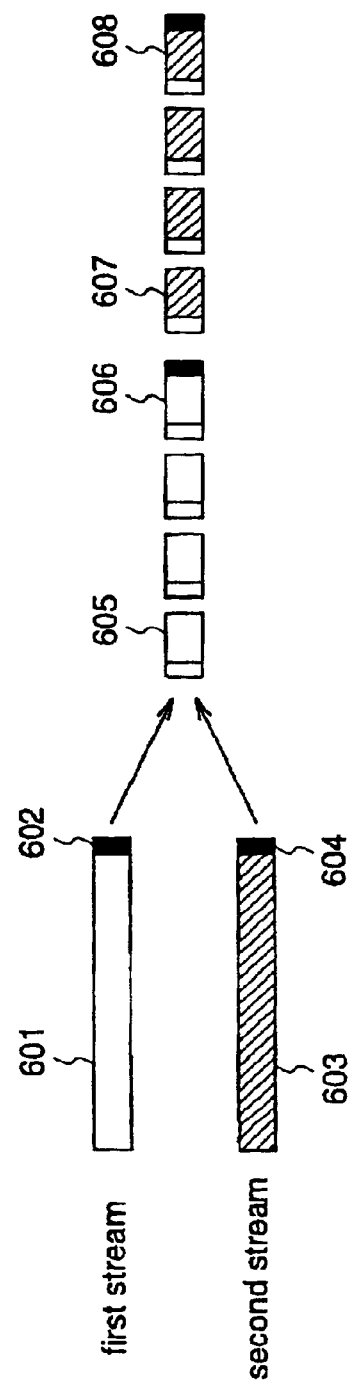
FIG. 6 is a diagram for explaining a method for switching a stream only at a decoding switchable position to generate a multiplexed stream, as a variation of a multiplexing process according to the second embodiment.

FIG. 6 is a diagram for explaining this multiplexing method. This figure shows Variation 1 of the second embodiment of the present invention. In this figure, numerals 601 and 603 denote first and second streams to be multiplexed, respectively. Numerals 602 and 604 denote decoding switchable positions in the streams 601 and 603, respectively. Numerals 605 and 606 denote multiplexing units in the first stream 601, and numerals 607 and 608 denote multiplexing units in the second streams 603, respectively.

The structure of a multiplexer for executing this multiplexing method is the same as the one shown in FIG. 4.

In Variation 1 of the second embodiment, the multiplexing means 407 carries out the multiplexing by successively switching the multiplexing units which are obtained by subdividing the first and second streams 601 and 603 successively from the left end in FIG. 6, stream by stream. When the multiplexing process has been completed Up to the decoding switch position 602, the multiplexing means 407 switches the stream to be multiplexed from the first stream 601 to the second stream 603. To be more specific, after carrying out the multiplexing process for the multiplexing unit 606 including the decoding switch position 602 in the first stream 601, the multiplexing process is switched from the first stream 601 to the second stream 603.

In the decoder which receives the multiplexed stream obtained by the multiplexing according to the above-mentioned method, the respective streams included in the multiplexed stream are decoded in the order of the multiplexing process, and at a time when the multiplexing target stream is switched the stream to be decoded is switched, whereby the decoding process can be carried out for plural streams composing the multiplexed stream in parallel.

This decoder comprises a stream conversion means 1002 for converting a stream to be demultiplexed into a stream having other data structure, a stream buffer 1004 for containing the converted stream, a decoding means 1009 for decoding an output of the stream buffer 1004, a decoding switch position detection means 1013 for detecting a position in a decoding target stream 1005 being decoded by the decoding means 1009, at which a decoding process for the stream being decoded can be switched to a decoding process for a stream other than this stream, a decoding stream switching control means 1017 for judging whether the decoding process for the stream is switched or not in accordance with a signal 1014 indicating the decoding switch position in the stream 1005, a change switch 120 for outputting one of the decoded signals corresponding to the respective streams from the decoding means 1009 in accordance with a signal 1018 indicating the judgement result, and a composition means 111 for composing the decoded signals corresponding to the respective streams output from the switch 120 and outputting a composed signal 112 to a display device (not shown).

Figure 11:
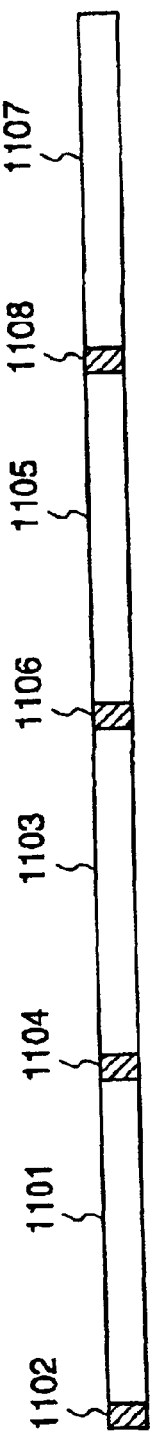
FIG. 11 is a diagram for explaining a multiplexed stream whose format has been converted by a stream conversion means of the decoder shown in FIG. 10.

Next, the operation of the decoder will be described. This decoder receives the multiplexed stream shown on the right in FIG. 6. Information concerning, for example, the length of a stream corresponding to one frame is previously set, and when the stream is input, the stream conversion means 1002 recognizes the end or beginning of one frame using this information. Then, the stream conversion means 1002 adds an identifier to the end or beginning 1102, 1104, 1106 or 1108 of the stream as shown in FIG. 11. Here, numerals 1101 and 1103 in FIG. 11 denote first and second streams, respectively, and first and second objects which are transmitted by these streams are demodulated and displayed at, for example, time t. Numerals 1105 and 1107 denote first and second streams, respectively, and first and second objects which are transmitted by these streams are demodulated and displayed at, for example, time t+δt. The output 903 of the stream conversion means 902 in FIG. 9 has the same format as in FIG. 11.

Then, the stream 1003 to which the identifier has been added is stored in the stream buffer 1004. Then, the decoding stream switching control means 1017 controls the decoding means 1009 and the stream change switch 120 at a time when the decoding switch position detection means 1013 detects the identifier as the switchable position from the output stream 1005, whereby the decoding result of the first stream 501 which has been input first to the decoding means 1009 is output to the corresponding input terminal of the composition means 111.

Thereafter, similarly, the stream change switch 120 is switched each time when the decoding switch position is detected in the stream being decoded so that the stream which is input to the decoding means 1009 and the demodulate signal which is output to the composition means 111 become the same stream, i.e., when the stream which is input to the decoding means 1009 is the first or second stream, the demodulate signal which is output to the input terminal of the composition means 111, corresponding to each stream, is the one obtained by decoding the first or second stream.

The composition means 111 composes the decoded signals which have been input to the input terminals corresponding to the respective streams, and outputs the composed image signal 112 to the display device.

According to this decoder, because the input stream has a data structure in which information is arranged alternately in units of one frame, the identifier indicating the partition of the frame can be added with utilizing this data structure on the side of the decoder. Therefore, the multiplexed stream can be decoded by one decoding means without providing the demultiplexing means.

Next, a description is given of the second multiplexing method in which the specified information indicating the decoding switch position, such as a flag, is not multiplexed.

According to this method, on the decoding end, when it is determined that a stream to be decoded is switched on the boundary of the multiplexing units in each stream, such as one frame, the decoder which receives this multiplexed stream can detect the boundary of the multiplexing unit as the decoding switch position at the time when the stream has been demultiplexed, even when no specified information indicating the decoding switch position is included in the multiplexed stream.

Figure 7:
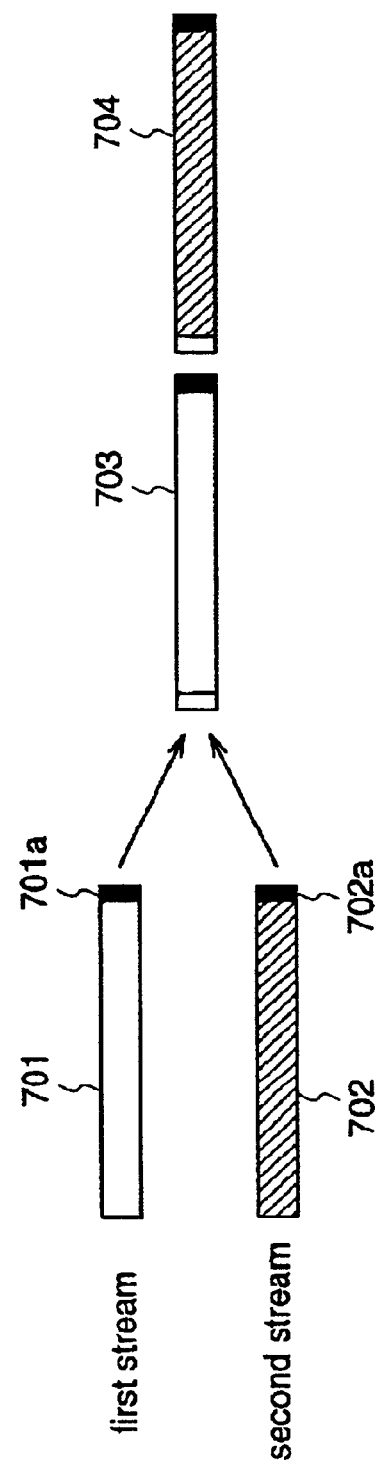
FIG. 7 is a diagram for explaining a process for multiplexing plural streams so that an end position of a multiplexing unit matches with a decoding switch position, as a variation of the multiplexing process according to the second embodiment.
Figure 8:
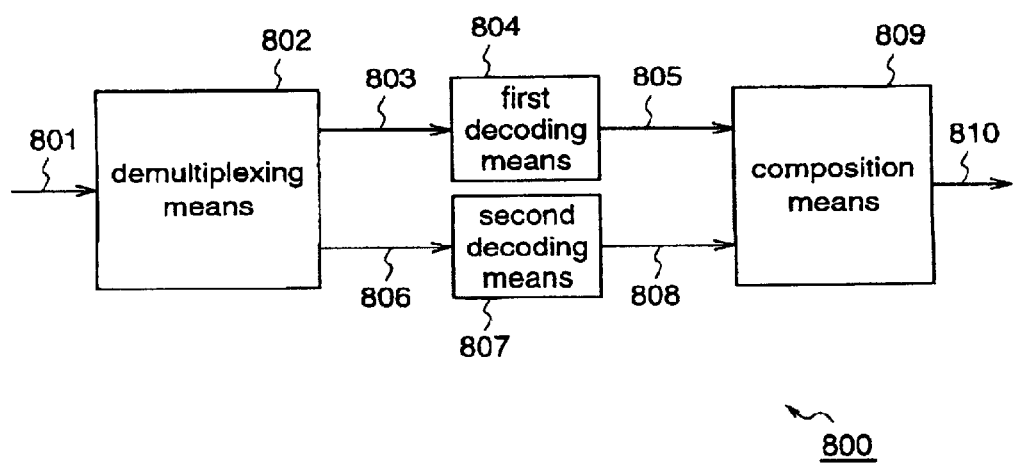
FIG. 8 is a block diagram for explaining a prior art decoder.

FIG. 7 is a diagram for explaining this multiplexing method as Variation 2 of the second embodiment of the present invention.

In this figure, numerals 701 and 702 denote first and second streams to be multiplexed, respectively. Numerals 701a and 702a denote decoding switchable positions in the streams 701 and 702, respectively. In addition, numeral 703 denotes a multiplexing unit in the first stream 701 and numeral 704 denotes a multiplexing unit in the second stream 702.

In the Variation 2 of the second embodiment, the multiplexing means 407 multiplexes the first and second streams 701 and 702 successively from the left end in FIG. 7, respectively.

The multiplexing means 407 carries out the multiplexing process by alternately switching the streams 701 and 702 input for example by one frame, as they are as the multiplexing units 703 and 704, at the decoding switch positions 701a and 702a. In the decoder which receives the multiplexed stream obtained by multiplexing the streams by the above-mentioned method, the end position of the multiplexing unit is detected by the demultiplexing, and the decoding processes for plural streams can be carried out in parallel, taking the detected position as the decoding switch position.

For example, in the case of H.223 as a multiplexing standard of the International Telecommunication Union (ITU), a multiplexing unit called AL-SDU is used and the decoder can recognize this multiplexing unit. Further, when the end of the multiplexing unit is matched with the boundary of frames, slices, video packets, macroblocks, blocks (coding units) or the like of MPEG video, the decoding process for the multiplexed stream which has been partitioned in the above-mentioned coding units to be multiplexed can be carried out by the decoder which can switch the decoding at the boundary of those coding units. At this time, plural frames, slices, video packets, macroblocks, blocks of MPEG video or single frame, slice, video packet, macroblock, block can be stored in one multiplexing unit.

Here, it is also possible that a kind of switchable coding units (for example, a frame, a slice, a video packet, a macroblock, a block of MPEG video) is previously transmitted from the decoder to the multiplexer, and a stream to be multiplexed is switched only at the boundary of the coding units in the multiplexer.

In addition, in the Variations of the second embodiment, the structure for multiplexing two streams and generating the multiplexed stream is shown. However, it is also possible to generate a multiplexed stream including three or more streams in the same way as in the second embodiment.

Further, in this second embodiment, as the streams composing the multiplexed stream, the ones which are obtained by coding the video data are shown. However, the streams composing the multiplexed stream can be ones which are obtained by coding other media data such as audio.

What is claimed is:

1. A decoder for receiving a multiplexed stream which is obtained by multiplexing plural streams, and carrying out a decoding process for each stream included in the multiplexed stream in a parallel processing, the decoder comprising:

a demultiplexing unit operable to separate the multiplexed stream into plural streams by a demultiplexing process;

a decoding unit operable to carry out a decoding process for one of the plural separated streams; and a stream selection unit operable to select one of the plural separated streams and output the selected one of the plural separated streams to the decoding unit, thereby converting a decoding target in the decoding unit from one stream to another stream;

wherein said stream selection unit has a position detection unit operable to detect a stream switchable position in a stream being subjected to the decoding process, at which position the decoding unit can interrupt the decoding process, and wherein said stream selection unit performs the stream selection such that the decoding process for the stream which is being processed is interrupted at the stream switchable position.

2. The decoder of claim 1, comprising:

a stream storage unit operable to store each of the plural separated streams by a predetermined amount from a head or a stream switchable position thereof to a subsequent stream switch position, wherein said stream selection unit performs the stream selection such that the plural separated streams are output from the stream storage unit successively from a stream for which the process for storing the stream by the predetermined amount has been completed.

3. The decoder of claim 1, wherein each of the plural separated streams is obtained by carrying out a coding process for digital data repeatedly for each predetermined coding unit, and the stream switchable position in each of the streams matches with a head position or a rearmost position of the coding unit.

4. A decoding method for carrying out a decoding process for a multiplexed stream which is obtained by multiplexing plural streams in parallel for each of the streams included in the multiplexed stream, the decoding method comprising:

separating the multiplexed stream into plural streams;

selecting one of the plural separated streams such that a target of a decoding process is converted from one stream to another stream; and decoding one of the plural separated streams output by the stream selection process, wherein said selecting comprises detecting a stream switchable position in a stream being subjected to said decoding, at which position said decoding can be interrupted, and performing said selecting such that said decoding for the stream which is being processed is interrupted at the stream switchable position.

5. A decoder for subdividing plural streams into first multiplexing units, receiving a multiplexed stream which is obtained by switching the respective streams successively for each of the first multiplexing units, and carrying out a decoding process for each stream included in the multiplexed stream, the decoder comprising:

a stream conversion unit operable to convert the multiplexed stream into a multiplexed stream composed of second multiplexing units which are obtained by gathering a plurality of the first multiplexing units together for the respective streams;

a switch position detection unit operable to detect a switch position of each of the multiplexing units in the multiplexed stream which has been converted by the stream conversion unit; and a decoding unit operable to carry out a decoding process corresponding to each stream on the basis of the switch position information detected by the switch position detection unit.

6. The decoder of claim 5, wherein the second multiplexing unit corresponds to a head or the stream switch position of each of the plural streams to a subsequent stream switch position.

7. A decoder for subdividing plural streams into first multiplexing units, receiving a multiplexed stream which is obtained by switching each of the streams successively for each second multiplexing unit obtained by gathering a plurality of the first multiplexing units together for each of the streams, and carrying out a decoding process for each stream which is included in the multiplexed stream, the decoder comprising:

a stream conversion unit operable to add switch position information indicating a switch position of each stream to the multiplexed stream, to perform conversion of the multiplexed stream;

a switch position detection unit operable to detect a switch position of each of the multiplexing units in the multiplexed stream which has been converted by the stream conversion unit; and a decoding unit operable to carry out a decoding process corresponding to each stream, on the basis of switch position information detected by the switch position detection unit.

8. The decoder of claim 7, wherein the second multiplexing unit corresponds to a head or the stream switch position of each of the plural streams to a subsequent stream switch position.

9. A decoding method for subdividing plural streams into first multiplexing units, receiving a multiplexed stream which is obtained by switching each of the streams successively for each of the first multiplexing units, and candying out a decoding process for each stream included in the multiplexed stream, the decoding method comprising:

converting the multiplexed stream into a multiplexed stream composed of second multiplexing units which are obtained by gathering a plurality of the first multiplexing units together;

detecting a switch position of each of the multiplexing units in the multiplexed stream which has been converted by said converting; and decoding each stream, which is carried out in correspondence with the stream on the basis of the switch position information detected by said detecting.

10. A decoding method for subdividing plural streams into first multiplexing units, receiving a multiplexed stream which is obtained by switching each of the streams successively for each second multiplexing unit obtained by gathering a plurality of the first multiplexing units together for each of the streams, and carrying out a decoding process for each stream included in the multiplexed stream, the decoding method comprising:

adding switch position information indicating a switch position of each stream to the multiplexed stream, to perform conversion of the multiplexed stream;

detecting a switch position of each of the multiplexing units in a multiplexed stream which has been converted by said adding; and decoding each stream, which is carried out in correspondence with the stream, on the basis of the switch position information detected by said detecting.

11. A multiplexer for multiplexing plural streams which are obtained by coding plural digital data, and outputting a multiplexed stream, the multiplexer comprising:

a position detection unit operable to detect a switchable position in a stream to be multiplexed, at which position a decoding process for the stream can be interrupted, and operable to output a signal indicating a decoding switchable position; and a multiplexing unit operable to carry out a multiplexing process of dividing each of the streams at the switchable position to generate divided stream parts corresponding to each stream and multiplexing the respective streams with the signal indicating the decoding switchable position taking the divided stream part as a unit, to output the multiplexed stream.

12. The multiplexer of claim 11, wherein each of the streams is obtained by carrying out a coding process for digital data repeatedly for each predetermined coding unit, and the stream switchable position of each of the streams matches with a head position or a rearmost position of the coding unit.

13. A multiplexing method for multiplexing plural streams which are obtained by coding plural digital data to generate a multiplexed stream, the multiplexing method comprising:

detecting a switchable position in a stream to be multiplexed, at which position a decoding process for the stream can be interrupted, and outputting a signal indicating a decoding switchable position; and dividing each of the streams at the switchable position to generate divided stream parts corresponding to each stream, and unifying the divided stream parts by the respective streams to generate the multiplexed stream which are multiplexed with the signal indicating the decoding switchable position.

14. The multiplexing method of claim 13, wherein each of the divided stream parts includes a plurality of multiplexing units each having a predetermined stream length.

15. A multiplexing method for carrying out a multiplexing process for plural streams which are obtained by coding plural digital data to generate a multiplexed stream, the multiplexing method comprising:

detecting a switchable position in each stream, at which a decoding process for the stream can be interrupted;

dividing each stream by a predetermined stream length to generate divided stream parts as multiplexing units; and adding to a head of each of the divided stream parts header information for identifying a corresponding stream, wherein a flag is added to header information corresponding to a divided stream part, an end position of which matches with a switchable position of the stream, for indicating that the end position matches with the switchable position of the stream.

16. A decoder for receiving a multiplexed stream which is obtained by multiplexing plural multiplexing units, and carrying out a decoding process for each multiplexing unit included in the multiplexed stream, the decoder comprising:

a stream selection unit operable to select one of the plural multiplexing units and output the selected one of the plural multiplexing units to a decoding unit, thereby converting a decoding target in the decoding unit from one multiplexing unit to another multiplexing unit;

wherein said decoding unit is operable to carry out a decoding process for the multiplexing unit converted by the stream selection unit;

wherein said stream selection unit has a position detection unit operable to detect a stream switchable position in a multiplexing unit being subjected to the decoding process, at which position the decoding unit can interrupt the decoding process; and wherein said stream selection unit performs the multiplexing unit selection such that the decoding process for the multiplexing unit which is being processed is interrupted at the stream switchable position.

* * * * *

UNITED STATES PATENT AND TRADEMARK OFFICE
CERTIFICATE OF CORRECTION

PATENT NO. : 6,925,097 B2  
DATED : August 2, 2005  
INVENTOR(S) : Makoto Hagai et al.

It is certified that error appears in the above-identified patent and that said Letters Patent is hereby corrected as shown below:

Column 19,
Line 10, replace "candying" with -- carrying --.

Signed and Sealed this

Fourteenth Day of February, 2006

JON W. DUDAS
*Director of the United States Patent and Trademark Office*